(12) United States Patent
Wang

(10) Patent No.: US 12,407,769 B2
(45) Date of Patent: Sep. 2, 2025

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Wenqiang Wang, Wuhan (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 114 days.

(21) Appl. No.: 17/607,790

(22) PCT Filed: Aug. 4, 2021

(86) PCT No.: PCT/CN2021/110575
§ 371 (c)(1),
(2) Date: Jan. 26, 2023

(87) PCT Pub. No.: WO2023/000389
PCT Pub. Date: Jan. 26, 2023

(65) Prior Publication Data
US 2024/0098169 A1 Mar. 21, 2024

(30) Foreign Application Priority Data
Jul. 19, 2021 (CN) .......................... 202110814875.5

(51) Int. Cl.
*H04M 1/02* (2006.01)
*G06F 1/16* (2006.01)

(52) U.S. Cl.
CPC ....... *H04M 1/0268* (2013.01); *H04M 1/0235* (2013.01); *H04M 1/0264* (2013.01);
(Continued)

(58) Field of Classification Search
CPC ............ H04M 1/0268; H04M 1/0235; H04M 1/0264; G06F 1/1624; G06F 1/1652; G06F 1/1686
See application file for complete search history.

(56) References Cited

U.S. PATENT DOCUMENTS 7,515,930 B2 * 4/2009 Eromaki ............. H04M 1/0237
455/575.4
7,557,851 B2 * 7/2009 Ohashi ................ H04M 1/0214
348/375
(Continued)

FOREIGN PATENT DOCUMENTS

CN 101106884 A 1/2008
CN 110035153 A 7/2019
(Continued)

OTHER PUBLICATIONS

Chinese Office Action issued in corresponding Chinese Patent Application No. 202110814875.5 dated May 17, 2022, pp. 1-4.
(Continued)

*Primary Examiner* — Patrick F Marinelli
(74) *Attorney, Agent, or Firm* — PV IP PC; Wei Te Chung

(57) ABSTRACT

A display device is provided. The display device includes a middle frame, a display panel, a light sensor, and a sliding mechanism. The light sensor is located under the display panel. The sliding mechanism includes a sliding key slidably assembled at a side portion of the middle frame. The sliding key passes through the side portion of the middle frame and is connected to the display panel. The sliding key drives the display panel to slide relative to the middle frame to control the display panel to block or expose the light sensor.

18 Claims, 9 Drawing Sheets

(52) U.S. Cl.
CPC .......... *G06F 1/1624* (2013.01); *G06F 1/1652* (2013.01); *G06F 1/1686* (2013.01)

(56) References Cited

U.S. PATENT DOCUMENTS

| | | | | |
|---|---|---|---|---|
| 7,953,463 | B2* | 5/2011 | Misawa | G06F 1/1622 |
| | | | | 455/575.4 |
| 7,966,048 | B2* | 6/2011 | Misawa | G06F 1/1686 |
| | | | | 455/575.4 |
| 8,295,897 | B2* | 10/2012 | Griffin | H04M 1/0235 |
| | | | | 455/566 |
| 10,444,802 | B2* | 10/2019 | Zeng | G06F 1/1686 |
| 10,601,966 | B2* | 3/2020 | Fan | H04M 1/0264 |
| 10,659,667 | B1* | 5/2020 | Qiu | G03B 17/04 |
| 10,778,821 | B1* | 9/2020 | Yang | H04M 1/0264 |
| 11,216,037 | B2* | 1/2022 | Yang | G06F 1/1652 |
| 11,493,955 | B2* | 11/2022 | Ha | H04M 1/0264 |
| 11,849,060 | B2* | 12/2023 | Zhang | H04M 1/0268 |
| 11,963,322 | B2* | 4/2024 | Han | G06F 1/1652 |
| 2005/0157195 | A1* | 7/2005 | Ohashi | H04M 1/0214 |
| | | | | 348/333.06 |
| 2008/0084659 | A1* | 4/2008 | Misawa | H04M 1/0237 |
| | | | | 361/679.01 |
| 2009/0203398 | A1* | 8/2009 | Griffin | H04M 1/0241 |
| | | | | 455/566 |
| 2010/0177038 | A1* | 7/2010 | Misawa | G06F 1/1686 |
| | | | | 345/156 |
| 2016/0021774 | A1 | 1/2016 | Ha et al. | |
| 2019/0138062 | A1* | 5/2019 | Zeng | H04M 1/0235 |
| 2019/0253533 | A1* | 8/2019 | Fan | H04M 1/0206 |
| 2019/0386697 | A1* | 12/2019 | Luo | H04B 1/3888 |
| 2020/0034033 | A1* | 1/2020 | Chaudhri | H04N 23/60 |
| 2020/0084307 | A1* | 3/2020 | Gong | H04N 23/57 |
| 2020/0177773 | A1* | 6/2020 | Yoo | H04M 1/0264 |
| 2020/0341517 | A1* | 10/2020 | Yang | H04M 1/0216 |
| 2021/0026408 | A1* | 1/2021 | Ha | G06F 1/1605 |
| 2023/0097982 | A1* | 3/2023 | Kim | G06V 40/1306 |
| | | | | 455/575.4 |
| 2023/0156103 | A1* | 5/2023 | Zhang | G06F 1/1652 |
| | | | | 455/575.4 |
| 2024/0023259 | A1* | 1/2024 | Han | G06F 1/1686 |
| 2024/0031465 | A1* | 1/2024 | Wang | H04N 23/667 |
| 2024/0040023 | A1* | 2/2024 | Wang | H04M 1/0235 |
| 2024/0098169 | A1* | 3/2024 | Wang | H04M 1/0268 |

FOREIGN PATENT DOCUMENTS

| | | |
|---|---|---|
| CN | 210093271 U | 2/2020 |
| CN | 112735276 A | 4/2021 |

OTHER PUBLICATIONS

Rejection Decision issued in corresponding Chinese Patent Application No. 202110814875.5 dated Jul. 18, 2022.
International Search Report in International application No. PCT/CN2021/110575, mailed on Apr. 26, 2022.
Written Opinion of the International Search Authority in International application No. PCT/CN2021/110575, mailed on Apr. 26, 2022.
Chinese Office Action in corresponding Chinese Patent Application No. 202110814875.5 dated Jan. 4, 2022, pp. 1-7.

* cited by examiner

DISPLAY DEVICE

RELATED APPLICATIONS

This application is a Notional Phase of PCT Patent Application No. PCT/CN2021/110575 having international filing date of Aug. 4, 2021, which claims the benefit of priority of Chinese Patent Application No. 202110814875.5 filed on Jul. 19, 2021. The contents of the above applications are all incorporated by reference as if fully set forth herein in their entirety.

TECHNICAL FIELD

The present disclosure relates to the display technology field, and more particularly to a display device.

BACKGROUND ART

In order to realize a full-screen design of a display device, a pop-up camera design is often used. A front camera is hidden at a top of a middle frame. When the front camera needs to perform a shooting action, the pop-up camera design implements a rising action to drive pop up the camera through a small motor to realize a camera function of the front camera. However, the design of the pop-up camera needs to use a drive motor. Accordingly, a manufacturing cost is increased, and the motor consumes a large amount of electricity. It is not easy to meet a requirement of long battery life of the whole machine.

Technical Problem

An objective of the present disclosure is to provide a display device for implementing a full-screen design of a display panel.

Technical Solution

The present disclosure provides a display device including a middle frame, a display panel, a light sensor, and a sliding mechanism. The middle frame includes a first top portion, a first bottom portion opposite to the first top portion, and a side portion connected to the first top portion and the first bottom portion. The middle frame includes a first accommodating space penetrating the first top portion. The display panel is slidably assembled in the first accommodating space. The light sensor is assembled in the first accommodating space and located under the display panel. The sliding mechanism includes a sliding key slidably assembled at the side portion of the middle frame. The sliding key passes through the side portion of the middle frame and connected to the display panel. The sliding key drives the display panel to slide relative to the middle frame to control the display panel to block or expose the light sensor.

Advantageous Effects

In the display device provided by the present disclosure, the sliding key of the sliding mechanism slides along the middle frame to drive the display panel in the first accommodating space to slide relative to the middle frame, so that the light sensor is exposed or hidden under the display panel. Compared with the conventional pop-up camera design, the present disclosure can reduce power consumption of a display device on a basis of implementing a full-screen design of the display device. This is beneficial for meeting a requirement of long battery life of the whole machine.

DETAILED DESCRIPTION OF EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure but are not intended to limit the present disclosure.

Figure 1A:
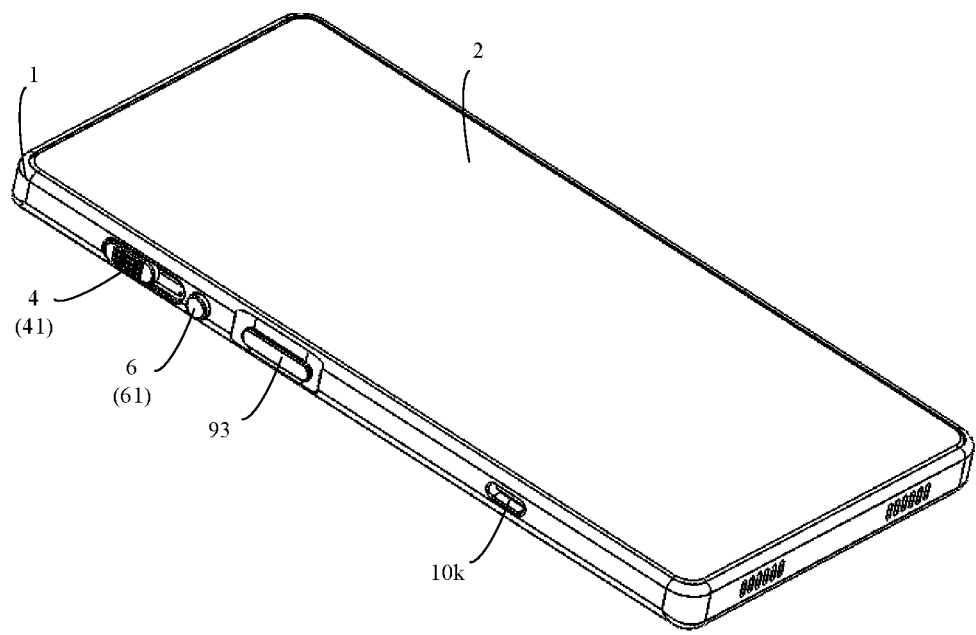
FIGS. 1A to 1D illustrate structure diagrams of a display device provided by an embodiment of the present disclosure.
Figure 1B:
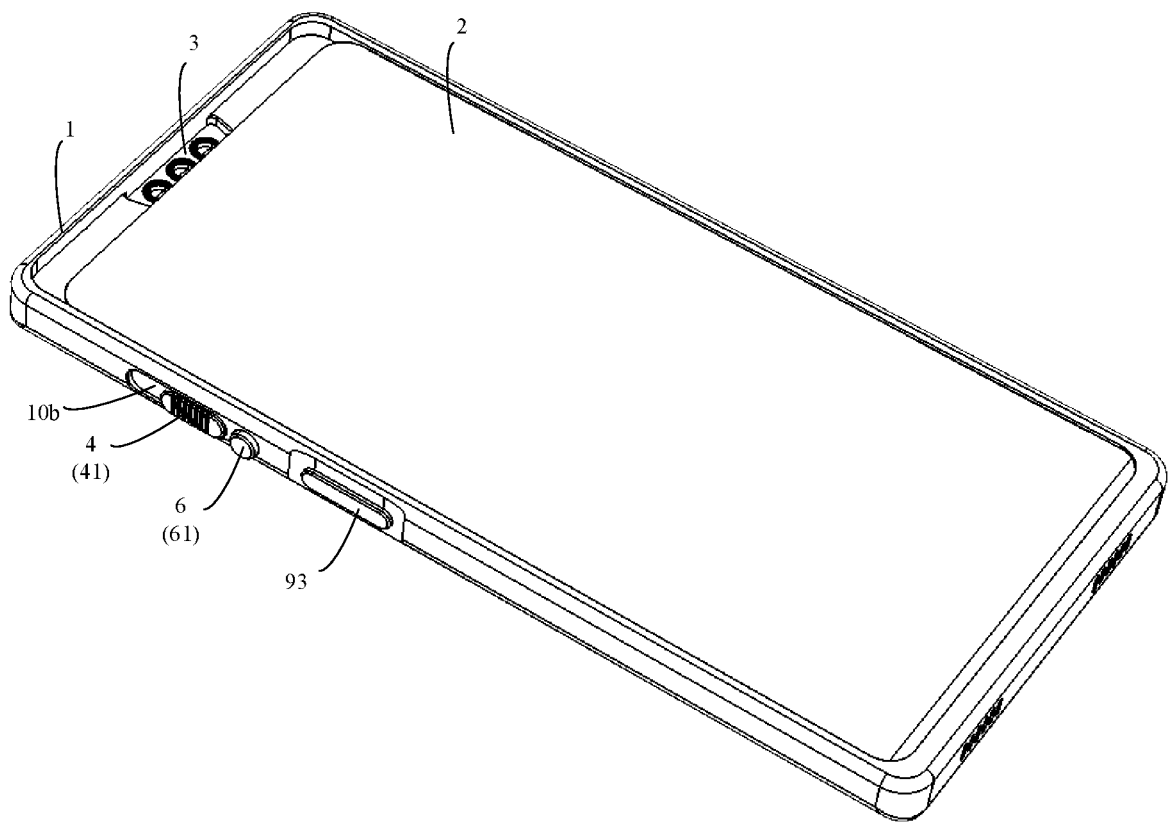
Figure 1C:
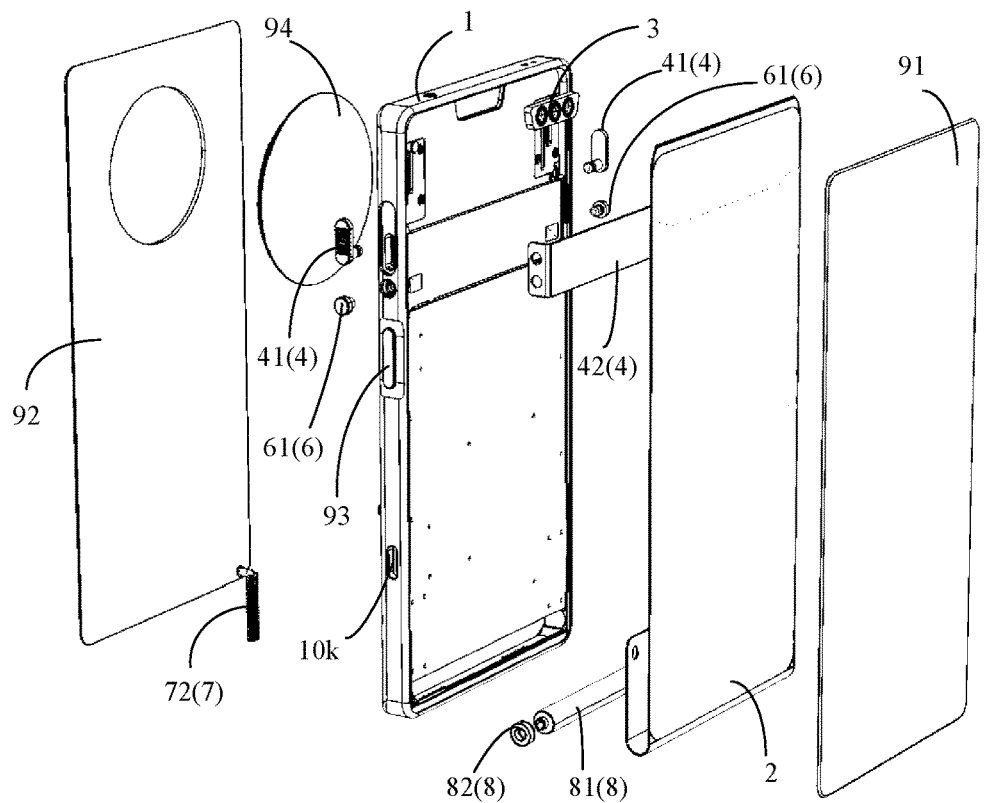
Figure 1D:
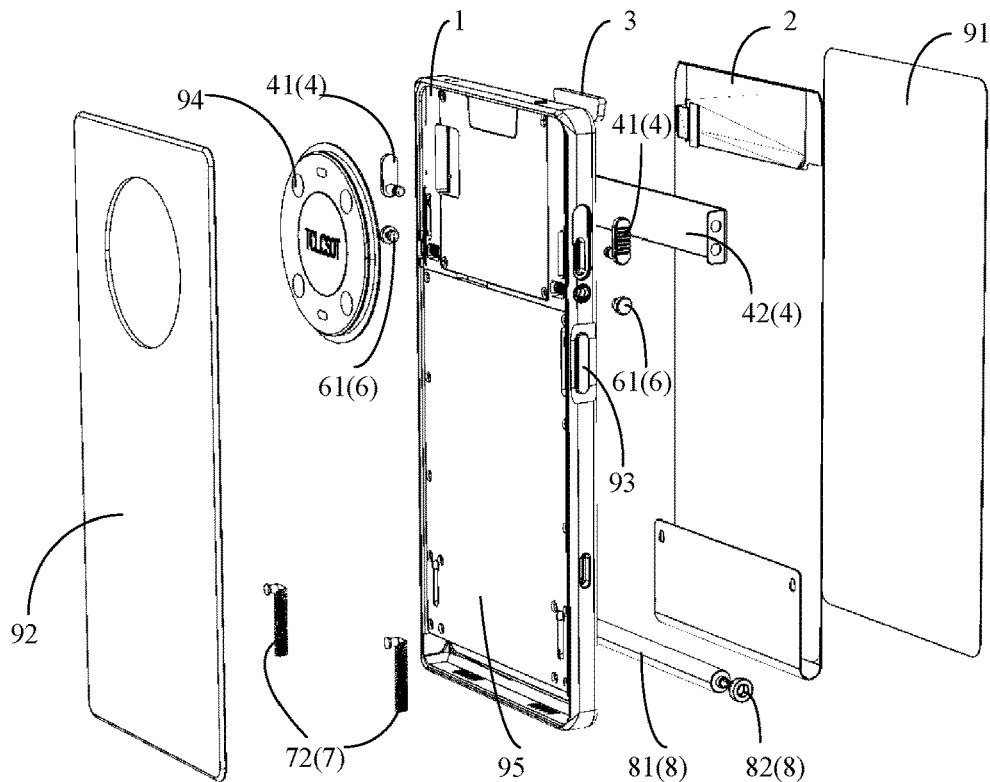

Specifically, FIG. 1A to FIG. 1D illustrate structure diagrams of a display device provided by an embodiment of the present disclosure. FIG. 1A illustrates a structure diagram of the display device when a light sensor is hidden under a display panel. FIG. 1B illustrates a structure diagram of the display device when the light sensor is exposed. FIG. 1C illustrates a front exploded view of the display device. FIG. 1D illustrates a rear exploded view of the display device.

The embodiment of the present disclosure provides the display device. Optionally, the display device includes a fixed terminal (such as a television, a desktop computers and so on), a mobile terminal (such as a mobile phones, a notebook computer and so on), a wearable device (such as a bracelet, a virtual display device or an enhanced display device and so on) and so on.

The display device includes a middle frame 1, a display panel 2, a light sensor 3, and a sliding mechanism 4.

Figure 2A:
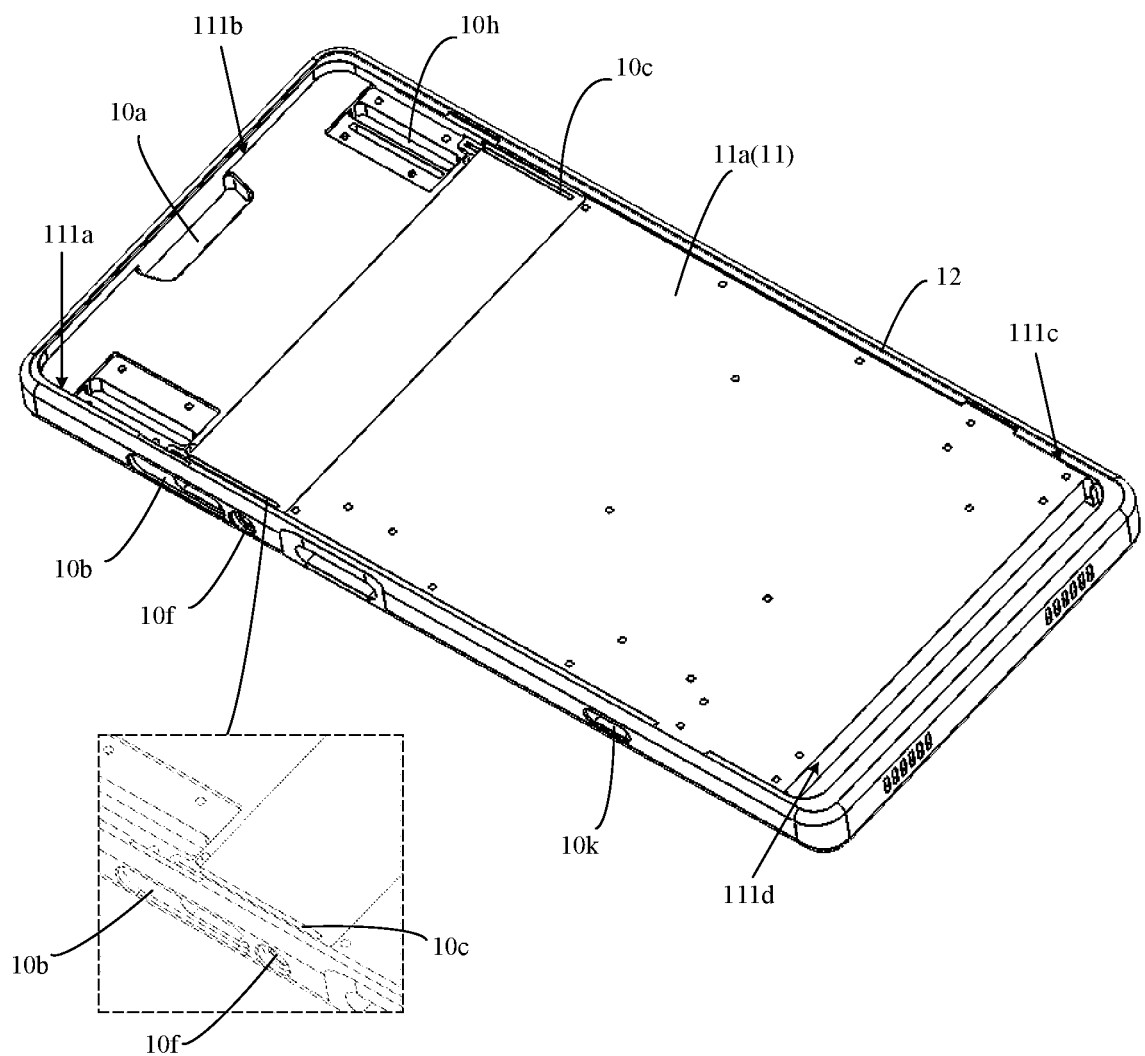
FIGS. 2A to 2B are structure diagrams of a middle frame provided by an embodiment of the present disclosure.
Figure 2B:
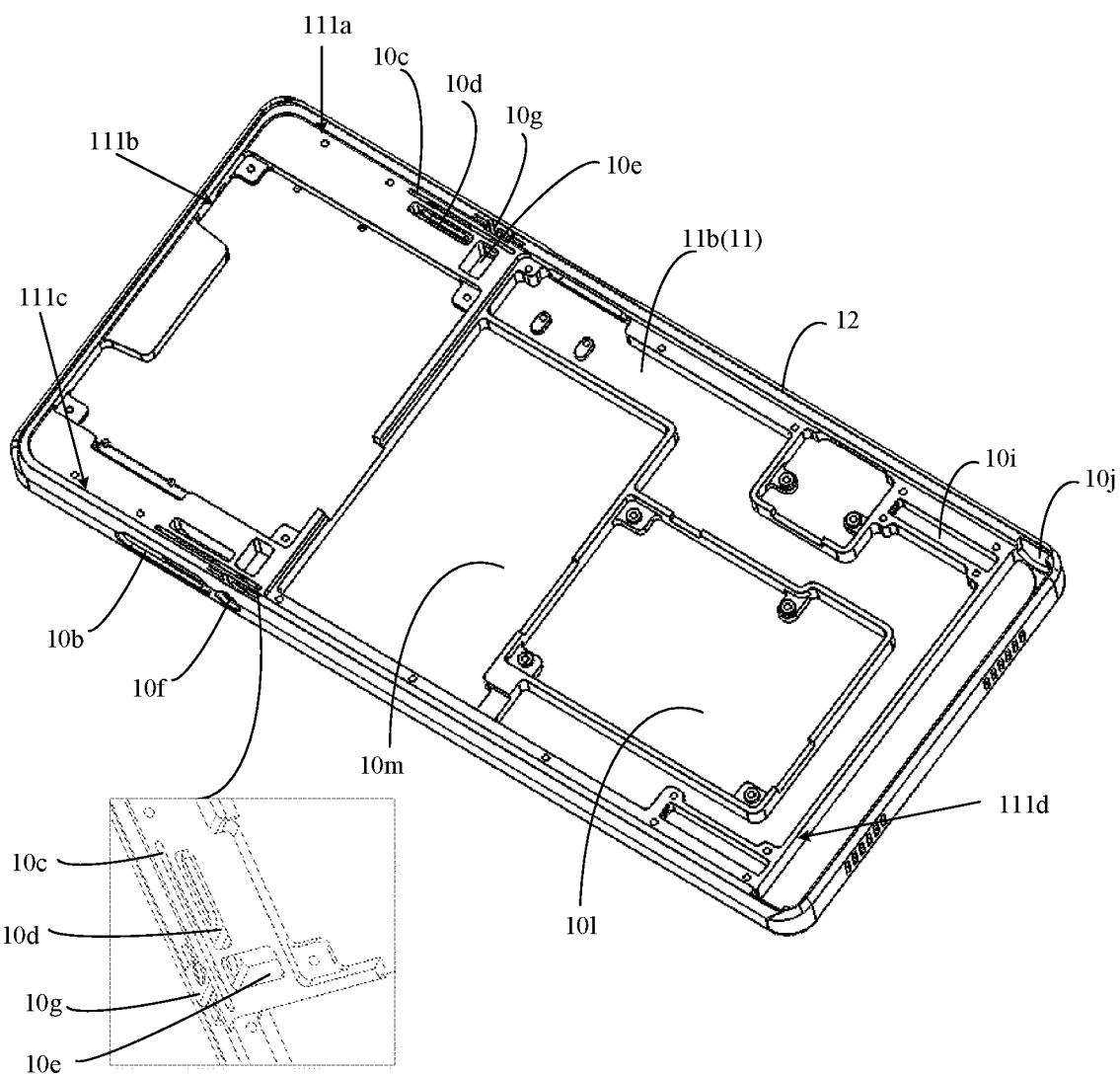

FIGS. 2A to 2B are structure diagrams of the middle frame provided by an embodiment of the present disclosure. FIG. 2A illustrates a front view structure diagram of the middle frame. FIG. 2B illustrates a rear view structure diagram of the middle frame. The middle frame 1 includes a supporting body 11 and a frame 12 located on a periphery of the supporting body 11. The supporting body 11 includes a first top portion 11a and a first bottom portion 11b opposite to each other. The supporting body 11 includes a first side 111a, a second side 111b connected to the first side 111a, a third side 111c opposite to the first side 111a and connected to the second side 111b, and a fourth side 111d connected to the first side 111a and the third side 111c and opposite to the second side 111b. The frame 12 is connected to the first side 111a, the second side 111b, and the third side 111c of the supporting body 11, and the frame 12 is not connected to the fourth side 111d. The frame 12, the first top portion 11a, the fourth side 111d, and the first bottom portion 11b form a first accommodating space. The first accommodating space communicates with the first top portion 11a and the first bottom portion 11b through a position at which the frame 12 is not connected to the fourth side 111d.

Please continue to refer to FIGS. 1A to 1D and FIGS. 2A to 2B. The display panel 2 is slidably assembled in the first accommodating space. Optionally, the display panel 2 includes a passive light-emitting display panel, a self-luminous display panel, a quantum dot display panel or the like.

The light sensor 3 is assembled in the first accommodating space and located under the display panel 2. Specifically, the middle frame 1 is provided with a first groove 10a. The first groove 10a is located in the first top portion 11a of the supporting body 11 and is close to the second side 111b. The light sensor 3 is located in the first groove 10a. Optionally, the light sensor 3 includes a camera, a fingerprint sensor, a distance sensor or the like.

The sliding mechanism 4 includes a sliding key 41 slidably assembled at a side portion of the middle frame 1. The sliding key 41 passes through the side portion of the middle frame 1 and is connected to the display panel 2 to drive the display panel 2 to slide relative to the middle frame 1, thereby exposing the light sensor 3 or hiding the light sensor 3 under the display panel 2. Specifically, a first sliding groove 10b is disposed at a side of the frame 12 which is connected to first side 111a of the supporting body 11 and/or at a side of the frame 12 which is connected to the third side 111c of the supporting body 11. The sliding key 41 is assembled in the first sliding groove 10 b and connected to the display panel 2. When the sliding key 41 slides in the first sliding groove 10b, the sliding key 41 drives the display panel 2 to slide relative to the middle frame 1 in the first accommodating space, thereby exposing the light sensor 3 or hiding the light sensor 3 under the display panel 2.

By providing the sliding key 41 at the side portion of the middle frame 1, the sliding key 41 drives the display panel 2 to slide in the first accommodating space relative to the middle frame 1. When the display device needs to use the light sensor 3, the light sensor 3 hidden under the display panel 2 is exposed. Alternatively, when the display device does not need to use the light sensor 3, the light sensor 3 is hidden under the display panel 2 by the display panel. This is beneficial for realizing a full-screen design of the display device. Furthermore, compared with the conventional pop-up camera design, the present disclose can expose or hide the light sensor 3 only by sliding the sliding key 41. A drive motor is not required. Accordingly, power consumption of the display device can be reduced. This is beneficial for the display device to meet a requirement of long battery life of the whole machine.

Please continue to refer to FIGS. 1A to 1D. In order to realize that when the sliding key 41 slides in the first sliding groove 10b, the display panel 2 can correspondingly slide, the sliding mechanism 4 further includes a sliding push plate 42. The sliding push plate 42 is connected to the display panel 2 and the sliding key 41. The sliding push plate 42 is located between the display panel 2 and the middle frame 1.

Figure 2C:
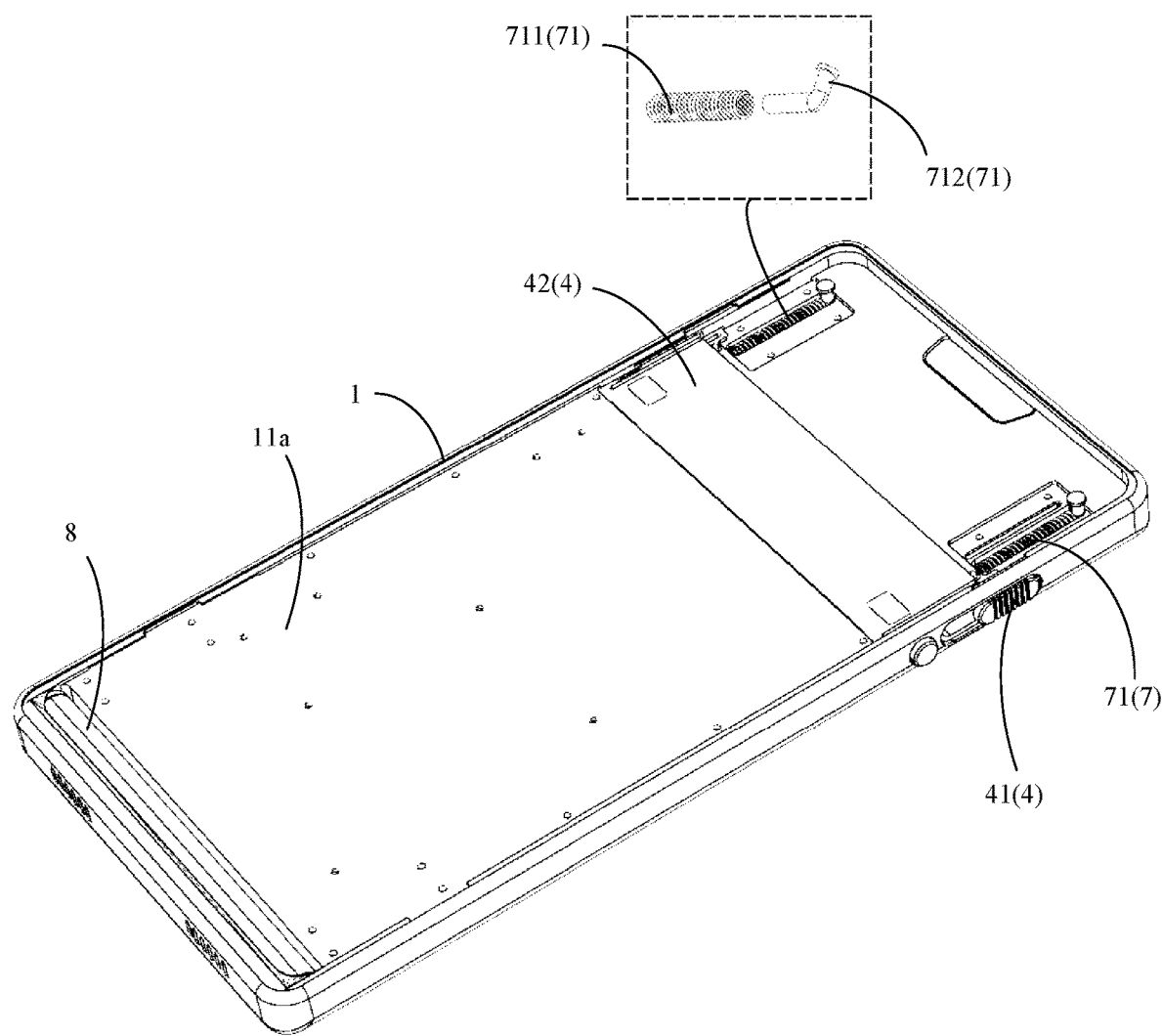
FIGS. 2C to 2D illustrate assembled structure diagrams of the middle frame, a sliding mechanism, an unlocking mechanism, a reset mechanism, and a rolling mechanism.
Figure 2D:
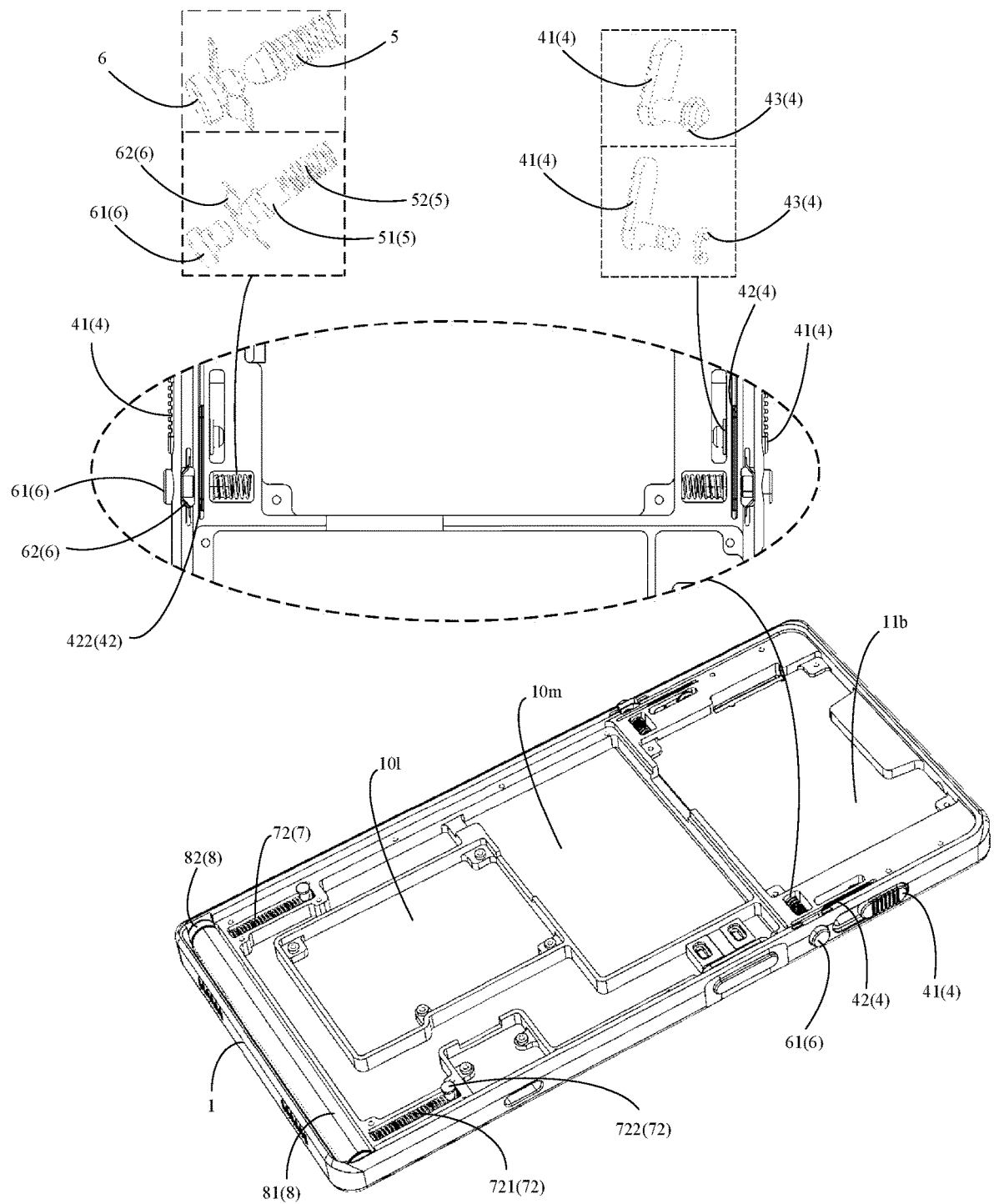
Figure 3A:
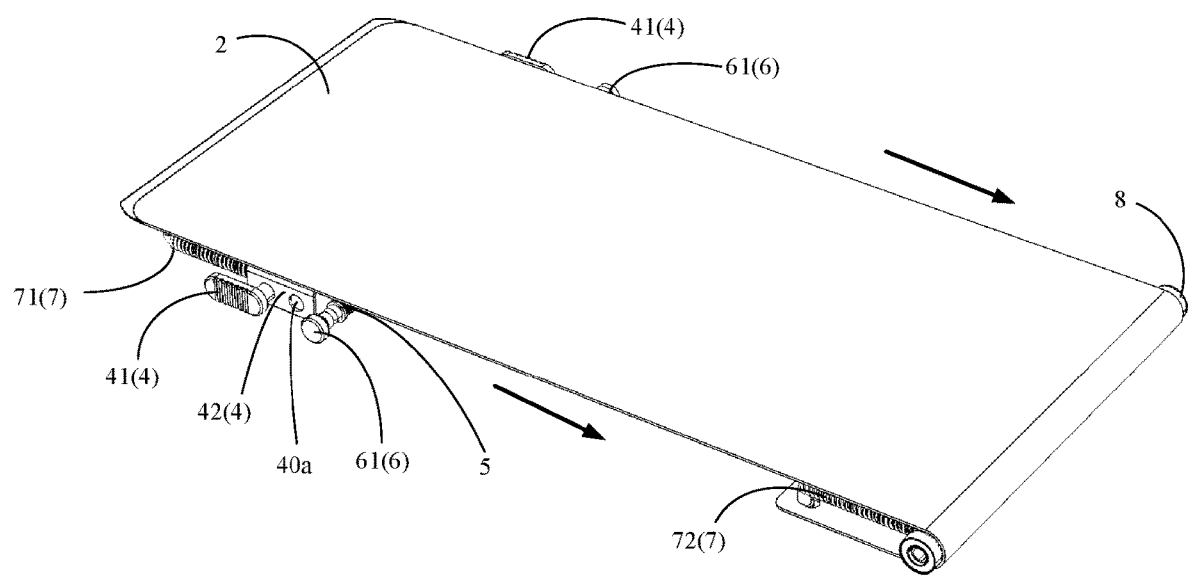
FIGS. 3A to 3C illustrate assembled structure diagrams of the sliding mechanism, a display panel, and the unlocking mechanism provided by an embodiment of the present disclosure.
Figure 3B:
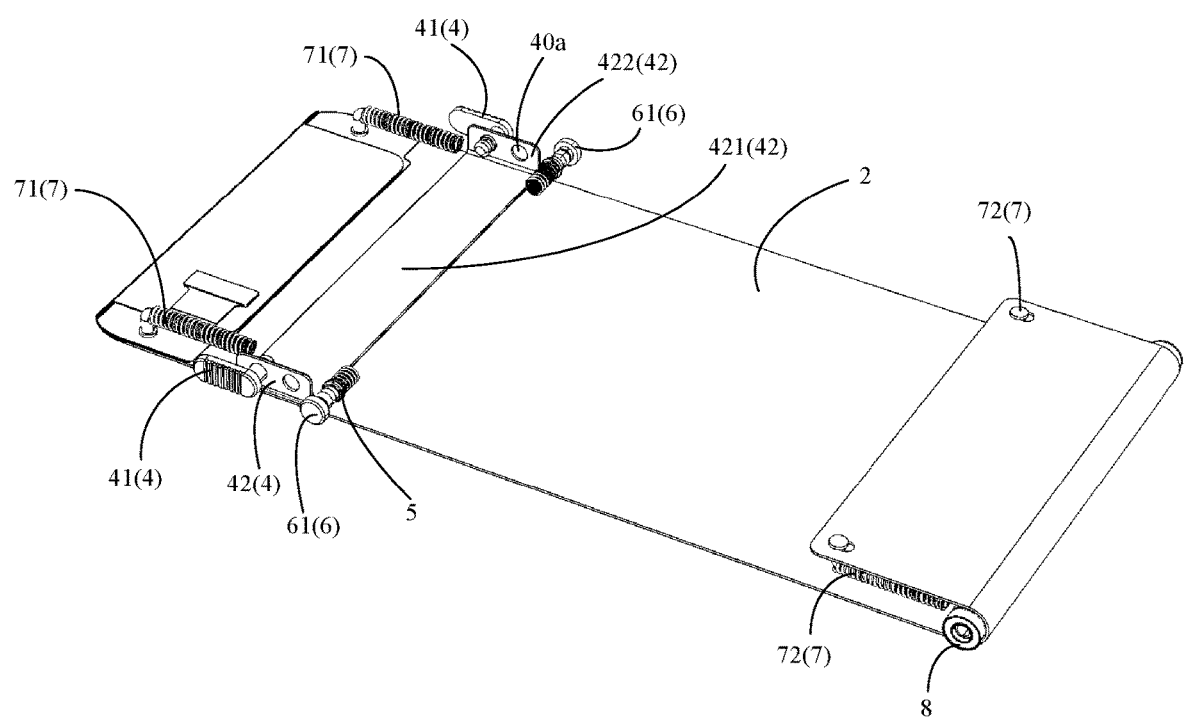
Figure 3C:
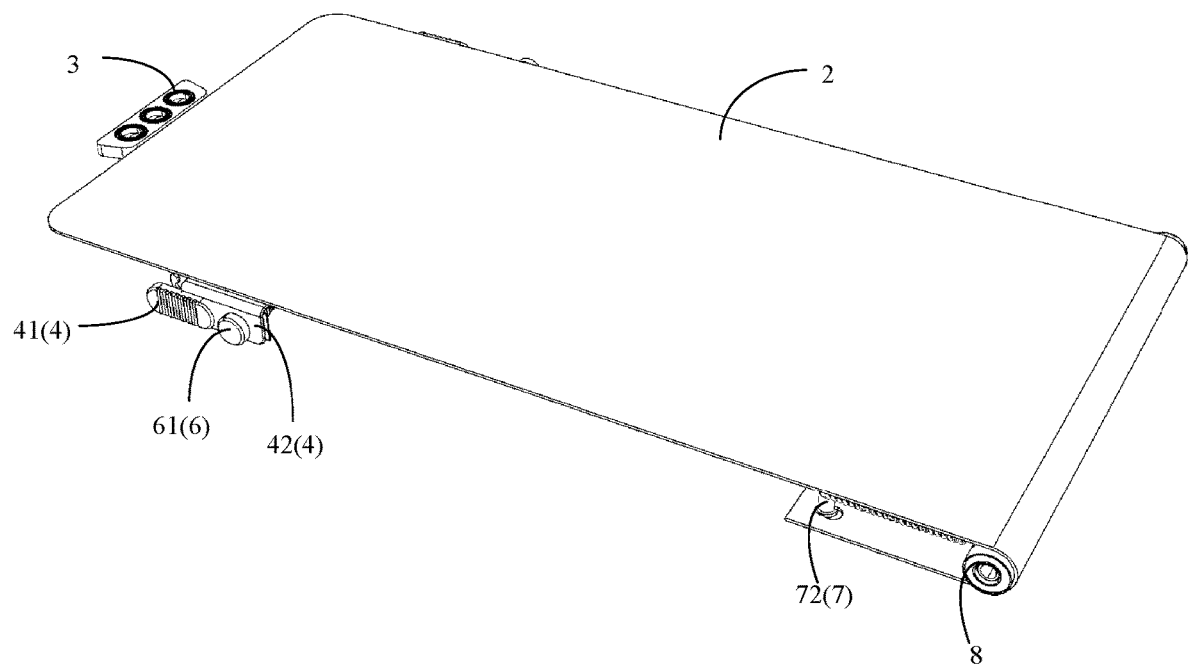

Specifically, FIGS. 3A to 3C illustrate assembled structure diagrams of the sliding mechanism, the display panel, and an unlocking mechanism provided by an embodiment of the present disclosure. FIGS. 2C to 2D illustrate assembled structure diagrams of the middle frame, the sliding mechanism, the unlocking mechanism, a reset mechanism, and a rolling mechanism. FIG. 3A illustrates a front view assembled structure diagram of the sliding mechanism and the display panel when the display panel blocks the light sensor. FIG. 3B illustrates a rear view assembled structure diagram of the sliding mechanism and the display panel when the display panel blocks the light sensor. FIG. 3C illustrates a front view assembled structure diagram of the sliding mechanism and the display panel when the display panel exposes the light sensor. Assembled structure diagrams of the sliding mechanism and the middle frame 1 are shown in FIGS. 2C to 2D.

The sliding push plate 42 includes a connecting plate 421 and an extending plate 422 connected to the connecting plate 421 and adjacent to the sliding key 41. The connecting plate 421 is fixedly connected to a bottom of the display panel 2. A positioning hole 40a is disposed in the extending plate 422. The sliding key 41 passes through the side portion of the middle frame 1 and the positioning hole 40a to be connected to the extending plate 422. The bottom of the display panel 2 represents a non-display side of the display panel 2.

Further, as shown in FIGS. 2A to 2B, a second groove 10c penetrating the supporting body 11 is disposed in the supporting body 11 of the middle frame 1. The second groove 10c communicates with the first sliding groove 10b. The extending plate 422 is located in the second groove 10c. The sliding key 41 includes a sliding portion and a fixed connecting portion connected to the sliding portion. The sliding portion is located in the first sliding groove 10b. The fixed connecting portion passes through the side portion of the middle frame 1 and the positioning hole 40a located in the extending plate 422 in the second groove 10c to realize a connection of the sliding key 41, the sliding push plate 42 and the display panel 2.

A length of the second groove 10c is greater than a length of the extending plate 422, so that the sliding key 41 can drive the display panel 2 to slide within a certain sliding range to expose the light sensor 3 or hide the light sensor 3 under the display panel 2.

Further, in order to ensure a reliable connection between the sliding key 41 and the sliding push plate 42, the sliding mechanism 4 further includes an opening retaining ring 43, as shown in FIG. 2D. The opening retaining ring 43 is clamped on the fixed connection portion of the sliding key 41 and located at a side of the extending plate 422 away from the sliding portion of the sliding key 41. Specifically, a third groove 10d is disposed in the supporting body 11 of the middle frame 1. The third groove 10d is located at a side of the second groove 10c away from the first sliding groove 10b. The third groove 10d is parallel to and communicates with the second groove 10c. The opening retaining ring 43 is located in the third groove 10d and is clamped to the fixed connecting portion of the sliding key in the third groove 10d, as shown in FIG. 2B and FIG. 2D.

In order to prevent a loose connection between the sliding key 41 and the sliding push plate 42 resulted from motion of the opening retaining ring 43 in the third groove 10d, the fixed connecting portion located in the third groove 10d can have different cross-sectional dimensions. Specifically, a cross-sectional size of a portion of the fixed connecting portion contacting the opening retaining ring 43 is smaller than a cross-sectional size of a side of the fixed connecting portion located in the opening retaining ring 43 away from the extending plate 422, as shown in FIG. 2D.

Optionally, the first sliding groove 10b is a rectangular sliding groove with rounded corners. Optionally, the first sliding groove 10b is a stepped groove. Optionally, a shape of a location where the first sliding groove 10b communicates with the second groove 10c can be a rectangle with rounded corners. A shape of a location where the second groove 10c and the third groove 10d can be a rectangle with rounded corners. Optionally, a plurality of protrusions can be disposed on a surface of the sliding portion of the sliding key 41 to increase friction force, thereby facilitating the sliding of the sliding key 41.

Optionally, a length of the third groove 10d is smaller than the length of the second groove 10c. Further, the length of the third groove 10d can be greater than or equal to a sliding distance of the display panel 2 relative to the middle frame 1.

Please continue to refer to FIGS. 1A to 1D, 2A to 2D, and 3A to 3C. When the light sensor 3 is exposed, the display panel 2 remains in a state where the light sensor 3 is not blocked. The display device further includes a positioning mechanism 5.

The positioning mechanism 5 includes a positioning member. The positioning member includes a positioning member 51 movably assembled in the middle frame 1. When the display panel 2 exposes the light sensor 3, the positioning member 51 extends into a positioning hole 40a. When the display panel 2 blocks the light sensor 3, the positioning member 51 is separated from the positioning hole 40a. As such, positioning of the display panel 2 is achieved through the positioning member.

Further, the positioning member further includes a first elastic member 52. The first elastic member 52 is connected between the positioning member 51 and the middle frame 1. When the display panel 2 blocks the light sensor 3, the first elastic member 52 is in an elastic deformation state. The first elastic member 52 has elastic potential energy which drives the positioning member 51 to move toward the positioning hole 40a. Optionally, the positioning member includes a spring pin.

Specifically, a fourth groove 10e is disposed in the first bottom portion 11b of the supporting body 11 of the middle frame 1. The fourth groove 10e is adjacent to the third groove 10d and communicates with the second groove 10c. The first elastic member 52 is located in the fourth groove 10e and connected between the positioning member 51 and the middle frame 1. The extending plate 422 of the sliding push plate 42 includes two adjacent positioning holes 40a. One of the two positioning holes 40a is penetrated by the fixed connecting portion of the sliding key 41 to implement the connection of the sliding key 41 and the sliding push plate 42. When the display panel 2 exposes the light sensor 3, the first elastic member 52 provides the elastic potential energy for the positioning member 51. The positioning member 51 extends into the other of the two positioning holes 40a to implement the positioning of the display panel 2.

That is, when the display device needs to use the light sensor 3, the sliding key 41 is sliding to control the sliding key 41 to slide in the first sliding groove 10b. Since the sliding key 41 is connected to the sliding push plate 42 through the one of the positioning holes 40a and the sliding push plate 42 is assembled to the bottom portion of the display panel 2, the sliding key 41 drives the sliding push plate 42 to slide to drive the display panel 2 to slide relative to the middle frame 2. When the other positioning hole 40a in the extension plate 422 corresponds to the position of the positioning member, the first elastic member 52 provides the elastic potential energy for the positioning member 51 to move in a direction toward the positioning hole 40a. As such, the positioning member 51 extends into the positioning hole 40a, so that the display panel 2 stops a moving action relative to the middle frame 1 to implement the positioning of the display panel 2.

Optionally, the positioning member 51 includes a round head positioning pin, and the first elastic member 52 includes a spring. Further, the first elastic member 52 includes a compression spring. Optionally, one end of the positioning member 51 with a round head design is disposed toward the extending plate 422 to facilitate the positioning member 51 to extend into the positioning hole 40a or to be separated from the positioning hole 40a.

Optionally, the positioning member 51 can have only one diameter. The diameter of the positioning member 51 is greater than or equal to an inner diameter of the first elastic member 52, so as to a situation that the positioning of the display panel 2 cannot be implemented because the positioning member 51 is completely sleeved in the first elastic member 52. Optionally, the positioning member 51 can have a plurality of diameters. That is, the positioning member 51 includes a first positioning portion, a second positioning portion, and a third positioning portion. The second positioning portion is located between the first positioning portion and the third positioning portion. A diameter of the second positioning portion is greater than diameters of the first positioning portion and the third positioning portion and greater than the inner diameter of the first elastic member 52. A diameter of the third positioning portion is smaller than the inner diameter of the first elastic member 52, so that the third positioning portion is sleeved in the first elastic member 52, and the second positioning portion is used to avoid the whole positioning member 51 to be sleeved in the first elastic member 52.

Optionally, a shape of a location where the second groove 10c communicates with the fourth groove 10e is a rectangle, a circle, and the like. Further, a size of the shape of the location where the second groove 10c communicates with the fourth groove 10e is larger than a cross-sectional size of the positioning member 51 to ensure that the positioning member 51 can effectively extend into the positioning 40a.

Please continue to refer to FIGS. 1A to 1D, 2A to 2D, and 3A to 3C. After the display device uses the light sensor 3, the display panel 2 needs to reset the light sensor 3 to control the light sensor 3 to be hidden under the display panel 2, so that the display device is restored to a full-screen state. Accordingly, the display device further includes an unlocking mechanism 6.

The unlocking mechanism 6 includes an unlocking key. The unlocking key includes an abutting member 61 movably assembled at the side portion of the middle frame 1 to be close to or away from the positioning member 51. When the display panel 2 exposes the light sensor 3 and the abutting member 61 is away from the positioning member 51, the positioning member 51 extends into the positioning hole 40a. When the display panel 2 exposes the light sensor 3 and the abutting member 61 is close to the positioning member 51, the abutting member 61 abuts the positioning member 51 to control the positioning member 51 to be separated from the positioning hole 40a.

Further, the unlocking key further includes an unlocking member 62. The unlocking member is connected to the side portion of the middle frame 1, and the abutting member 61 passes through the unlocking member 62. When the display panel 2 exposes the light sensor 3 and the abutting member 61 is close to the positioning member 51, the unlocking member 62 is in an elastic deformation state. The unlocking member 62 has elastic potential energy of driving the abutting member 61 to move toward a direction away from the positioning member 51.

Specifically, in the middle frame 1, unlocking holes 10f are disposed at a side of the frame 12 which is connected to first side 111a of the supporting body 11 and/or at a side of the frame 12 which is connected to third side 111c. A fifth groove 10g is disposed in the first bottom portion 11b of the supporting body 11 in the middle frame 1. The fifth groove 10g communicates with the unlocking hole 10f, the second groove 10c, and the fourth groove 10e. A location where the fifth groove 10g communicates with the second groove 10c and a location where the fifth groove 10g communicates with the fourth groove 10e are disposed corresponding to the unlocking holes 10f. A portion of the abutting member 61 passes through the unlocking hole 10f and extends into the fifth groove 10g. The unlocking member 62 is located in the fifth groove 10g and sleeved on the portion of the abutting member 61.

When the display device needs to hide the light sensor 3 under the display panel 2, elastic deformation of the unlocking member 62 assembled on the abutting member 61 occurs in the fifth groove 10g by pressing the unlocking key. At this time, the abutting member 61 abuts the positioning member 51, so that the positioning member 51 is separated from the positioning hole 40a. Then, the abutting member 61 uses elastic potential energy, which is accumulated when the unlocking member 62 is pressed, to move in a direction away from the positioning member 51 to complete unlocking of the positioning mechanism 5 and the sliding mechanism 4.

Optionally, the abutting member 61 includes a pin. The unlocking member 62 includes an elastic piece. Further, the unlocking member 62 includes two first unlocking portions, two second unlocking portions, and a third unlocking portion. The third unlocking portion is located between the two second unlocking portions. The two first unlocking portions are respectively located at sides of the second unlocking portions away from the third unlocking portion. The second unlocking portions and the first unlocking portions and the third unlocking portion have included angle. The third unlocking portion is sleeved on the portion of the abutting member 61 extending into the fifth groove 10g. The first unlocking portions contact the middle frame 1. A width of a portion of the first unlocking portions received in the fifth groove 10g is smaller than a width of a portion of the second unlocking portions received in the fifth groove 10g and a width of a portion of the third unlocking portion received in the fifth groove 10g. Optionally, a through hole or a groove is disposed in the third unlocking portion to ensure that the unlocking member 62 can be sleeved on the abutting member 61. It can be understood that the unlocking member 62 and the abutting member 61 can adopt interference fit which is not repeated herein.

Please continue to refer to FIGS. 1A to 1D and FIGS. 2A to 2D. After the unlocking of the positioning mechanism 5 and the sliding mechanism 4, the display panel 2 can automatically return to an original position to block the light sensor 3. The display device further includes a reset mechanism 7.

The reset mechanism 7 includes a first reset member 71. The first reset member 71 is connected between the middle frame 1 and the bottom of the display panel 2. The first reset member 71 includes a second elastic member 711. When the display panel 2 exposes the light sensor 3, the second elastic member 711 is in an elastic deformation state. The second elastic member 711 has elastic potential energy for driving the display panel 2 to move toward a direction of the light sensor 3, so that the display panel 2 blocks the light sensor 3.

Further, in order to ensure that the display panel 2 still remains a flat and straight state during a sliding process of the display panel 2 relative to the middle frame 1 or in a situation that the light sensor 3 is exposed or the light sensor 3 is blocked, the reset mechanism 7 can further include a second reset member 72 connected between the middle frame 1 and the bottom of the display panel 2.

The first reset member 71 is connected between the first top portion 11a of the middle frame 1 and the bottom of the display panel 2. The second reset member 72 is connected between the first bottom 11b of the middle frame 11 and the bottom of the display panel 2. The second reset member 72 includes a third elastic member 721. When the display panel 2 exposes the light sensor 3, only the second elastic member 711 is in an elastic deformation state or both the second elastic member 711 and the third elastic member 721 are in the elastic deformation state. The second elastic member 711 and the third elastic member 721 have elastic potential energy which drives the display panel 2 to move toward the direction of the light sensor 3.

Specifically, when the display panel 2 exposes the light sensor 3 and only the second elastic member 711 is in the elastic deformation state, the display panel 2 is driven by the second elastic member 711 to move toward the direction of the light sensor 3 after the positioning mechanism 5 and the sliding mechanism 4 are unlocked, so that the light sensor 3 is hidden under the display panel 2. At this time, when the display panel blocks the light sensor 3, the third elastic member 721 is in the elastic deformation state. That is, when the display panel 2 exposes the light sensor 3, an amount of elastic deformation of the second elastic member 711 is greater than an amount of elastic deformation of the third elastic member 721. Correspondingly, the elastic potential energy of the second elastic member 711 is greater than the elastic potential energy of the third elastic member 721. When the light sensor 3 is hidden under the display panel 2, the amount of elastic deformation of the second elastic member 711 is smaller than the amount of elastic deformation of the third elastic member 721. Correspondingly, the elastic potential energy of the second elastic element 711 is smaller than the elastic potential energy of the third elastic element 721.

Specifically, when the display panel 2 exposes the light sensor 3 and both the second elastic member 711 and the third elastic member 721 are in the elastic deformation state, the display panel 2 is driven by the second elastic member 711 to move toward the direction of the light sensor 3 after the positioning mechanism 5 and the sliding mechanism 4 are unlocked, so that the light sensor 3 is hidden under the display panel 2. When the display panel blocks the light sensor 3, both the second elastic member 711 and the third elastic member 721 are in the elastic deformation state. A degree of elastic deformation of the third elastic member 721 when the light sensor 3 is hidden under the display panel 2 is greater than a degree of elastic deformation of the third elastic member 721 when the display panel 2 exposes the light sensor 3. That is, when the display panel 2 exposes the light sensor 3, the amount of elastic deformation of the second elastic member 711 is greater than the amount of elastic deformation of the third elastic member 721. Correspondingly, the elastic potential energy of the second elastic member 711 is greater than the elastic potential energy of the third elastic member 721. When the light sensor 3 is hidden under the display panel 2, the amount of elastic deformation of the second elastic member 711 is smaller than the amount of elastic deformation of the third elastic member 721. Correspondingly, the elastic potential energy of the second elastic element 711 is smaller than or equal to the elastic potential energy of the third elastic element 721.

Further, in order to implement an effective connection of the first reset member 71, the second reset member 72, and the display panel 2, the first reset member 71 further includes a first connecting member 712, and the second reset member 72 further includes a second connecting member 722. The first connecting member 712 is connected between the display panel 2 and the second elastic member 711, and the second connecting member 722 is connected between the display panel 2 and the third elastic member 721.

Figure 4A:
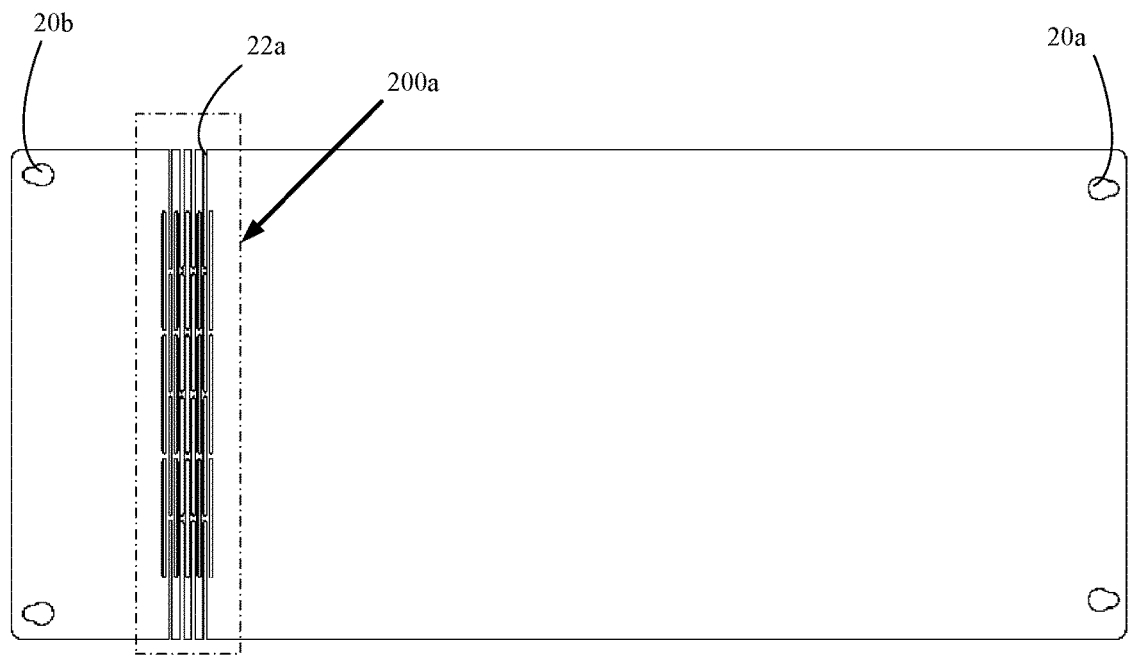
FIGS. 4A to 4B illustrate structure diagrams of the display panel provided by an embodiment of the present disclosure.
Figure 4B:
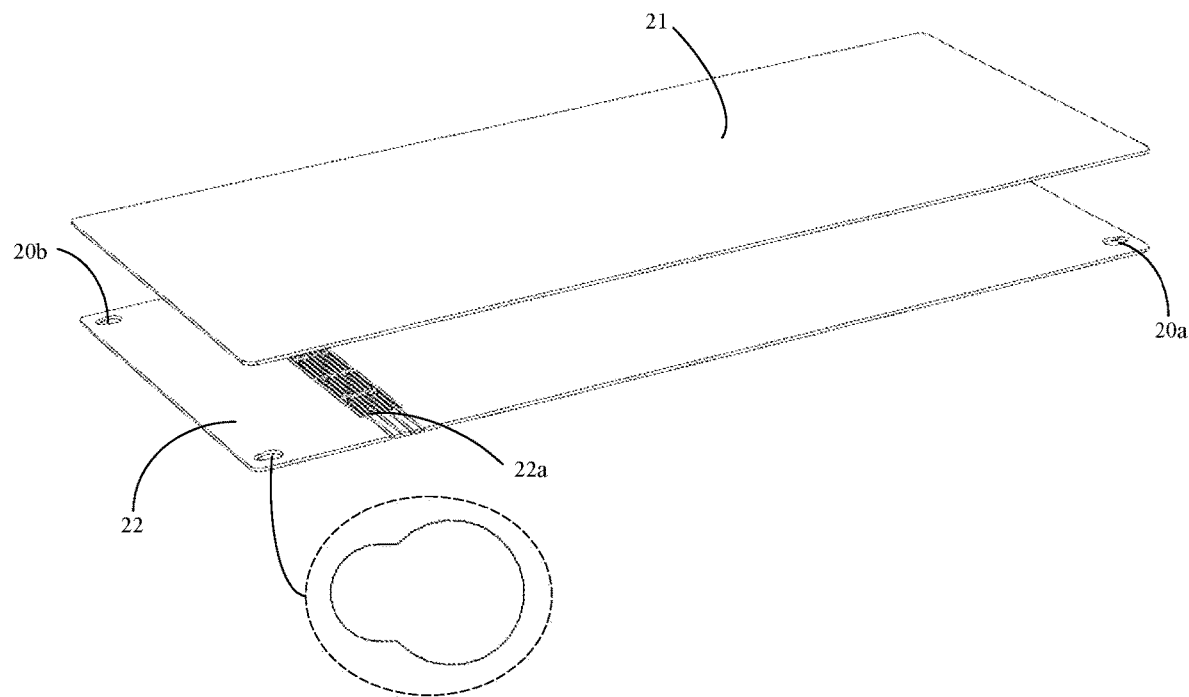

Specifically, FIGS. 4A to 4B illustrate structure diagrams of the display panel provided by an embodiment of the present disclosure. Please continue to refer to FIGS. 2A to 2D, 3A to 3C, and 4A to 4B. A sixth groove 10h is disposed in the first top portion 11a of the supporting body 11 of the middle frame 1. The six groove 10h is located at a side of the first groove 10a away from the second side 111b. A seventh groove 10i is disposed in the first bottom portion 11b of the supporting body 11 of the middle frame 1. A first clamping hole 20a is disposed in the bottom of the display panel 2 corresponding to the first top portion 11a of the middle frame 1, and a second clamping hole 20b is disposed in the bottom of the display panel 2 corresponding to the first bottom portion 11b of the middle frame 1. The first clamping hole 20a is arranged in alignment with the sixth groove 10h, and the second clamping hole 20b is arranged in alignment with the seventh groove 10i. One end of the first connecting member 712 is connected to the first clamping hole 20a, and the other end of the first connecting member 712 is connected to the second elastic member 711. One end of the second connecting member 722 is connected to the second clamping hole 20b, and the other end of the second connecting member 722 is connected to the third elastic member 721.

Optionally, two sixth grooves 10h can be disposed in the middle frame 1. In this case, the sixth grooves 10h can be located in locations of the first top portion 11a of the supporting body 11 close to the first side 111a and the third side 111c. Alternatively, only one sixth groove 10h is disposed in the middle frame 1. In this case, the sixth groove 10h can be located in a middle of the first top portion 11a and disposed close to the first groove 10a.

Optionally, two seventh grooves 10i can be disposed in the middle frame 1. In this case, the seventh grooves 10i can be located in locations of the first bottom portion 11b of the supporting body 11 close to the first side 111a and the third side 111c. Alternatively, only one seventh grooves 10i is disposed in the middle frame 1. In this case, the seventh grooves 10i can be located in a middle of the first bottom portion 11b.

Optionally, each of the first reset member 71 and the second reset member 72 includes a spring pin. Optionally, each of the second elastic element 711 and the third elastic element 721 is a spring. Further, each of the second elastic element 711 and the third elastic element 721 is a compression spring. The first connecting member 712 includes a first connecting portion and a second connecting portion perpendicularly connected to the first connecting portion. At least a portion of the first connecting portion is sleeved in the second elastic member 711. One end of the second connecting portion away from the first connecting portion is connected to the first clamping hole 20a. A portion where the second connecting portion is connected to the first clamping hole 20a corresponds to a portion where a cross-sectional size of the second connecting portion varies. The second connecting member 722 includes a third connecting portion and a fourth connecting portion perpendicularly connected to the third connecting portion. At least a portion of the third connecting portion is sleeved in the third elastic member 721. One end of the fourth connecting portion away from the third connecting portion is connected to the second clamping hole 20b. A portion where the fourth connecting portion is connected to the second clamping hole 20b corresponds to a portion where a cross-sectional size of the fourth connecting portion varies.

A stiffness coefficient of the second elastic member 711 is greater than a stiffness coefficient of the third elastic member 721 to ensure that after the positioning mechanism 5 and the sliding mechanism 4 are unlocked, the display panel 2 can freely slide and reset along the middle frame 1, and smoothness can be guaranteed when the display panel 2 slides relative to the middle frame 1. Optionally, the stiffness coefficient of the second elastic element 711 is greater than or equal to 1.2 times the stiffness coefficient of the third elastic element 721 and smaller than or equal to 2.5 times the stiffness coefficient of the third elastic element 721. Further, the stiffness coefficient of the second elastic element 711 is equal to 1.2 times, 1.5 times, 1.6 times, 1.7 times, 1.8 times, 1.9 times, 2 times, 2.2 times, 2.4 times, or 2.5 times the stiffness coefficient of the third elastic element 721. It can be understood that a specific relationship between the stiffness coefficient of the second elastic member 711 and the stiffness coefficient of the third elastic member 721 can be set according to actual requirements of the display device and is not repeated herein.

When the display panel 2 blocks the light sensor 3, the second elastic member 711 and the third elastic member 721 are both in the elastic deformation state. In an example, the sliding key 41 is located at a top end of the first sliding groove 10b when the display panel 2 blocks the light sensor 3, and the sliding key 41 is located at a bottom end of the first sliding groove 10b when the display panel 2 exposes the light sensor 3. Since the stiffness coefficient of the second elastic member 711 is greater than the stiffness coefficient of the third elastic member 721, the display panel 2 can be in a pre-tensioned and flat state because of a difference of the stiffness coefficient of the second elastic member 711 and the stiffness coefficient of the third elastic member 721.

When the display device needs to use the light sensor 3, the sliding key 41 slides down in the first sliding groove 10b by sliding the sliding key 41 and the sliding key 41 drives the sliding push plate 42 to slide, thereby driving the display panel 2 to slide relative to the middle frame 1. The second elastic member 711 is further elastically deformed. The elastic deformation of the third elastic member 721 is restored to a certain extent but still in the elastic deformation state. That is, when the second elastic member 711 and the third elastic member 721 are compression springs, an amount of compression of the second elastic member 711 is further increased, and an amount of compression is reduced to a certain extent. When the positioning member 51 extends into the positioning hole 40a, the display panel 2 stops sliding relative to the middle frame 1, so that the display panel 2 exposes the light sensor.

After the positioning mechanism 5 and the sliding mechanism 4 are unlocked, the elastic deformation of the second elastic member 711 is restored to a certain extent but is still in the elastic deformation state, and the third elastic member 721 is further elastically deformed. That is, when the second elastic member 711 and the third elastic member 721 are compression springs, the amount of compression of the second elastic member 711 is reduced to a certain extent, and the amount of compression of the third elastic member 721 is further increased. The second elastic member 711 and the third elastic member 721 are used to drive the display panel 2 to move relative to the middle frame 1 in the direction toward the light sensor 3. The sliding key 41 slides up in the first sliding groove 10*b* along movement of the display panel 2 until the display panel 2 blocks the light sensor 3.

Please continue to refer to FIGS. 1A to 1D and FIGS. 4A to 4B. In order to prevent working performance and a structure of the display panel 2 from being affected by the reset mechanism 7 connected to the display panel 2, the display panel 2 includes a panel main body 21 and a supporting layer 22 located between the panel main body 21 and the middle frame 1. The supporting layer 22 is connected to the panel main body 21. The first clamping hole 20*a* is disposed in the supporting layer 22 corresponding to the first top portion 11*a* of the middle frame 1. The second clamping hole 20*a* is disposed in the supporting layer 22 corresponding to the first bottom portion 11*b* of the middle frame 1.

Optionally, each of a shape of the first clamping hole 20*a* and a shape of the second clamping hole 20*b* includes a circular shape, an oval shape, a rectangular shape, a gourd shape and the like. Further, each of the shape of the first clamping hole 20*a* and the shape of the second clamping hole 20*b* is a gourd shape. One end of the first clamping hole 20*a* having a larger diameter can be disposed corresponding to one end of the second clamping hole 20*b* having a larger diameter, so that the display panel 2 does not slide left or right when the display panel slides up and down relative to the middle frame 1.

Please continue to refer to FIGS. 1A to 1D and FIGS. 4A to 4B. When the display panel 2 slides relative to the middle frame 1, a portion of the display panel 2 can be moved to the side where the first bottom portion 11*b* of the middle frame 11 is located. The display device further includes a rolling mechanism 8.

The rolling mechanism 8 includes a roller 81 and a rolling bearing 82 which are assembled in the first accommodating space. When the display panel 2 slides relative to the middle frame 1 to block or expose the light sensor 3, a portion of the display panel contacts the roller 81. A plurality of openings 22*a* are disposed in the supporting layer 22 in the portion of the display panel 2.

Specifically, an eighth groove 10*j* is disposed at an inner side where the frame 12 of the middle frame 1 does not contact the first side 111*a* and the third side 111*c* of the supporting body 11. The rolling bearing 82 is located in the eighth groove 10*j*. Two ends of the roller 81 are respectively located in the rolling bearing 82. When the display panel 2 slides relative to the middle frame 1, the portion of the display panel 2 contacts the roller 81. The openings 22*a* are disposed in the supporting layer 22 in the part of the display panel 2 contacting the roller 81. That is, the openings 22*a* are located in a curved area 200*a* of the display panel 2.

Optionally, a shape of each of the openings 22*a* includes at least one of a rounded rectangle, a right-angled rectangle, a circle, an ellipse and the like.

Figure 5:
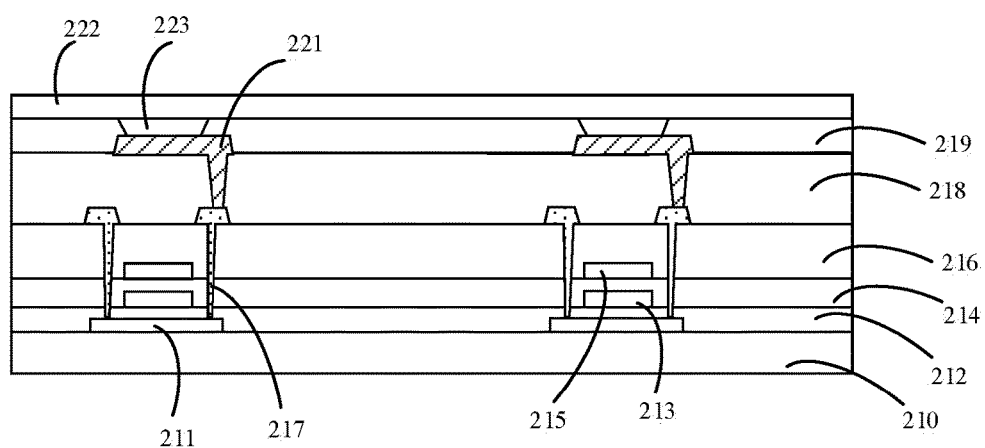
FIG. 5 illustrates a structure diagram of a panel main body provided by an embodiment of the present disclosure.

FIG. 5 illustrates a structure diagram of a panel main body provided by an embodiment of the present disclosure. Taking the display panel 2 as a flexible display panel as an example, the panel main body 21 includes an array substrate and a light-emitting device on the array substrate. Further, the array substrate includes a substrate 210 and a driving array located on the substrate 210 for driving the light-emitting device to emit light. The driving array includes a plurality of transistors and a plurality of connecting wires electrically connected to the transistors and the light-emitting device.

Further, the array substrate includes an active layer 211 on the substrate 210, a first insulating layer 212 covering the active layer 211, a first metal layer 213 disposed on the first insulating layer 212, a second insulating layer 214 covering the first metal layer 213, a second metal layer 215 disposed on the second insulating layer 214, an interlayer dielectric layer 216 covering the second metal layer 215, a third metal layer 217 disposed on the interlayer dielectric layer 216, and a flat layer 218 covering the third metal layer 217. The first metal layer 213 includes a gate electrode arranged in alignment with the active layer 211. The second metal layer 215 includes an electrode portion arranged in alignment with the gate electrode. The third metal layer 217 includes a source electrode and a drain electrode which are electrically connected to the active layer 211. Each of the transistors includes the gate electrode, the source, and the drain electrode. The connecting wires can be in the same layer as at least one of the gate electrode, the electrode portion, and the source electrode and the drain electrode.

The array substrate further includes a pixel defining layer 219. The pixel defining layer 219 includes a plurality of pixel openings. The light-emitting device includes an anode 221, a cathode 222, and a light-emitting layer 223 located between the anode 221 and the cathode 222 and in the pixel openings. The anode 221 can be located at a side of the light-emitting layer 223 away from the array substrate. Correspondingly, the cathode 222 is located at a side of the light-emitting layer 223 close to the array substrate. Alternatively, the anode 221 is located at the side of the light-emitting layer 223 close to the array substrate. Correspondingly, the cathode 222 is located at the side of the light-emitting layer 223 away from the array substrate.

It can be understood that the panel main body 21 can further include touch electrodes, polarizers and other parts not shown.

Please continue to refer to FIGS. 1A to 1D. The display device further includes an encapsulation layer 91, a back cover 92, and a power button 93. The encapsulation layer 91 includes at least one of a glass cover plate and a thin film encapsulation layer.

The display device further includes a control board. The side portion of the middle frame 1 can further include a data transmission interface 10*k*. A ninth groove 101 is disposed in the first bottom portion 11*b* of the middle frame 1. The ninth groove 101 is used to contain the control board, as shown in FIG. 2B.

Further, when the display device is a mobile terminal, the display device further includes an energy storage module. A tenth groove 10*m* is disposed in the first bottom 11*b* of the middle frame 1. The tenth groove 10*m* is used to contain the energy storage module. Optionally, the energy storage module includes a battery.

Further, the display device further includes a rear sensing module 94. A through hole is disposed in the back cover 92. The rear sensing module 94 is assembled on the first bottom 11*b* of the middle frame 1 and corresponds to the through hole. Optionally, the rear sensing module 94 includes a camera module, a fingerprint recognition module and the like.

Optionally, the display device further includes a shielding plate 95 for covering the control board and the energy storage module. An opening is disposed in the shielding plate 95 corresponding to the seventh groove 10*i*. One end of the second connecting member 722 passes through the opening to be clamped to the second clamping hole 20*b*, as shown in FIG. 1D.

It can be understood that in the display device shown in the example shown in FIGS. 1A to 1D, when the positioning member 51 extends into the positioning hole 40*a*, the display panel 2 exposes the light sensor 3. However, in some embodiments, it can be that when the positioning member 51 extends into the positioning hole 40a, the display panel 2 blocks the light sensor 3. In this case, the unlocking hole 10f can be closer to a top end of the middle frame 1 when compared with the first sliding groove 10b. Correspondingly, the sliding key 41 is connected to the positioning hole 40a in the extending plate 422 away from the top end of the middle frame 1. The reset mechanism 7 can only include the second reset member 72. The top end of the middle frame 1 refers to an end of the middle frame 1 where the frame 12 and the second side 111b of the supporting body 11 are connected.

Specifically, when the positioning member 51 extends into the positioning hole 40a, the display panel 2 blocks the light sensor 3. At this time, the third elastic member 721 is in the elastic deformation state. When the panel 2 exposes the light sensor 3, the third elastic member 721 is in a non-elastically deformed state. That is, when the unlocking key is pressed, the positioning member 51 is separated from the positioning hole 40a. The display panel 2 slides relative to the middle frame 1 in a direction away from the light sensor 3 under the action of the third elastic member 721 until the elastic deformation state of the third elastic member 721 disappears. The sliding motion of the display panel 2 relative to the middle frame 1 stops, so that the display panel 2 exposes the light sensor 3. When the sliding key 41 is slid, the sliding key 41 drives the display panel 2 to slide relative to the middle frame 1 and the third elastic member 721 is elastically deformed. When the positioning member 51 extends into the middle frame, the sliding action of the display panel 2 relative to the middle frame 1 stops. As such, the display panel 2 blocks the light sensor 3.

Furthermore, when the positioning member 51 extends into the positioning hole 40a, the display panel 2 blocks the light sensor 3. The reset mechanism 7 can include the first reset member 71 and the second reset member 72. However, in this case, an arrangement of the first reset member 71 needs to be rotated by 180° (that is, rotated by 180° in a plane parallel to the first top portion 11a) when compared to the arrangement shown in FIGS. 1A to 1D, so that the positioning member 51 extends into the positioning hole 40a. When the display panel 2 blocks the light sensor 3, the second elastic member 711 and the third elastic member 721 are both in the elastic deformation state. When the display panel 2 exposes the photosensor 3, the second elastic member 711 and the third elastic member 721 are both in the non-elastic deformation state. That is, when the unlocking key is pressed, the positioning member 51 is separated from the positioning hole 40a. The display panel 2 slides relative to the middle frame 1 in the direction away from the light sensor 3 under the action of the second elastic member 711 and the third elastic member 721 until the second elastic member 711 and the third elastic member 721 are restored to the non-elastically deformed state. The sliding motion of the display panel 2 relative to the middle frame 1 stops, so that the display panel 2 exposes the light sensor 3. When the sliding key 41 is slid, the sliding key 41 drives the display panel 2 to slide relative to the middle frame 1 and the second elastic member 711 and the third elastic member 721 are elastically deformed. When the positioning member 51 extends into the middle frame, the sliding action of the display panel 2 relative to the middle frame 1 stops. As such, the display panel 2 blocks the light sensor 3.

Specific examples are used in the present disclosure to describe the principle and implementation manners of the present disclosure. The descriptions of the foregoing embodiments are merely intended to help understand the method and core idea of the present disclosure. In addition, those skilled in the art may, according to the idea of the present disclosure, make modifications with respect to the specific implementation manners and the application scope. In summary, the content of the specification shall not be construed as a limitation to the present disclosure.

What is claimed is:

1. A display device, comprising:
   a middle frame, the middle frame comprising a first top portion, a first bottom portion opposite to the first top portion, and a side portion connected to the first top portion and the first bottom portion, the middle frame comprising a first accommodating space penetrating the first top portion;
   a display panel slidably assembled in the first accommodating space;
   a light sensor assembled in the first accommodating space and located under the display panel;
   a sliding mechanism comprising a sliding key slidably assembled at the side portion of the middle frame, the sliding key passing through the side portion of the middle frame and connected to the display panel, the sliding key driving the display panel to slide relative to the middle frame to control the display panel to block or expose the light sensor; and
   a positioning mechanism, the positioning mechanism comprising a positioning member, the positioning member comprising a positioning member movably assembled in the middle frame;
   wherein the sliding mechanism further comprises a sliding push plate, the sliding push plate is connected to the display panel, the sliding push plate comprises an extending plate adjacent to the sliding key, a positioning hole is disposed in the extending plate, and the sliding key passes through the side portion of the middle frame and is connected to the extending plate,
   wherein when the display panel exposes the light sensor, the positioning member extends into the positioning hole; and when the display panel blocks the light sensor, the positioning member is separated from the positioning hole.

2. The display device of claim 1, wherein the positioning member further comprises a first elastic member, the first elastic member is connected between the positioning member and the middle frame, when the display panel blocks the light sensor, the first elastic member is in an elastic deformation state and the first elastic member has elastic potential energy of driving the positioning member to move toward the positioning hole.

3. The display device of claim 2, wherein the positioning member comprises a round head positioning pin, and the first elastic member comprises a compression spring.

4. The display device of claim 2, wherein the middle frame comprises a second groove, the extending plate is located in the second groove, and a length of the second groove is greater than a length of the extending plate.

5. The display device of claim 4, wherein the middle frame further comprises a third groove parallel to and communicating with the second groove, the sliding mechanism further comprises an opening retaining ring, and the opening retaining ring is located in the third groove and is clamped to a portion of the sliding key in the third groove.

6. The display device of claim 5, wherein a length of the third groove is smaller than the length of the second groove and greater than or equal to a sliding distance of the display panel relative to the middle frame.

7. The display device of claim 6, wherein a fourth groove is disposed in the first bottom portion of the middle frame, the fourth groove is adjacent to the third groove and communicates with the second groove, and the first elastic member is located in the fourth groove.

8. The display device of claim 1, further comprising:
an unlocking mechanism, the unlocking mechanism comprising an unlocking key, the unlocking key comprising an abutting member movably assembled at the side portion of the middle frame to be close to or away from the positioning member;
wherein when the display panel exposes the light sensor and the abutting member is away from the positioning member, the positioning member extends into the positioning hole; and
when the display panel exposes the light sensor and the abutting member is close to the positioning member, the abutting member abuts the positioning member to control the positioning member to be separated from the positioning hole.

9. The display device of claim 8, wherein the unlocking key further comprises an unlocking member, the unlocking member connected to the side portion of the middle frame, the abutting member passing through the unlocking member;
wherein when the display panel exposes the light sensor and the abutting member is close to the positioning member, the unlocking member is in an elastic deformation state and the unlocking member has elastic potential energy of driving the abutting member to move toward a direction away from the positioning member.

10. The display device of claim 9, wherein the abutting member comprises a pin, and the unlocking member comprises an elastic piece.

11. The display device of claim 1, further comprising a reset mechanism, wherein the reset mechanism comprises:
a first reset member, the first reset member comprising a second elastic member, the second elastic member connected between the display panel and the middle frame;
wherein when the display panel exposes the light sensor, the second elastic member is in an elastic deformation state and the second elastic member has elastic potential energy of driving the display panel to move toward a direction of the light sensor.

12. The display device of claim 11, wherein the reset mechanism further comprises:
a second reset member, the second reset member comprises a third elastic member, the second reset member connected between a bottom of the display panel and the first bottom of the middle frame, the second elastic member connected between the bottom of the display panel and the first top portion of the middle frame;
wherein when the display panel exposes the light sensor, the third elastic member is in an elastic deformation state, the second elastic member and the third elastic member have elastic potential energy of driving the display panel to move toward the direction of the light sensor.

13. The display device of claim 12, wherein when the display panel blocks the light sensor and the elastic potential energy of the second elastic element is smaller than or equal to the elastic potential energy of the third elastic element.

14. The display device of claim 13, wherein a stiffness coefficient of the second elastic member is greater than a stiffness coefficient of the third elastic member.

15. The display device of claim 14, wherein the stiffness coefficient of the second elastic element is greater than or equal to 1.2 times the stiffness coefficient of the third elastic element and smaller than or equal to 2.5 times the stiffness coefficient of the third elastic element.

16. The display device of claim 14, wherein each of the second elastic element and the third elastic element is a spring.

17. The display device of claim 12, wherein the display panel comprises a panel main body and a supporting layer located between the panel main body and the middle frame, the supporting layer is connected to the panel main body, a first clamping hole is disposed in the supporting layer corresponding to the first top portion of the middle frame, and a second clamping hole is disposed in the supporting layer corresponding to the first bottom portion of the middle frame;
the first reset member further comprises a first connecting member connected between the display panel and the second elastic member, and the second reset member further comprises a second connecting member connected between the display panel and the third elastic member;
wherein one end of the first connecting member is connected to the first clamping hole, and one end of the second connecting member is connected to the second clamping hole.

18. The display device of claim 17, further comprising:
a rolling mechanism, the rolling mechanism comprising a roller assembled in the first accommodating space;
wherein when the display panel slides relative to the middle frame to block or expose the light sensor, a portion of the display panel contacts the display panel; and
a plurality of openings are disposed in the supporting layer in the portion of the display panel.

* * * * *